United States Patent
Yoshida et al.

(10) Patent No.: US 6,552,983 B1
(45) Date of Patent: Apr. 22, 2003

(54) APPARATUS AND METHOD FOR DETECTING ABNORMAL CONDITION AT THE TIME OF RECORDING OR REPRODUCING INFORMATION ON INFORMATION RECORDING MEDIUM

(75) Inventors: Masayoshi Yoshida, Tokorozawa (JP); Hidehiro Ishii, Tokorozawa (JP)

(73) Assignee: Pioneer Corporation, Tokyo-to (JP)

(*) Notice: Subject to any disclaimer, the term of this patent is extended or adjusted under 35 U.S.C. 154(b) by 57 days.

(21) Appl. No.: 09/640,779

(22) Filed: Aug. 18, 2000

(51) Int. Cl.[7] .............................................. G11B 7/00
(52) U.S. Cl. .................................. 369/53.12; 369/44.32
(58) Field of Search ........................... 369/44.32, 53.12, 369/53.13, 55.15, 53.16, 53.17, 53.26, 53.27, 53.3, 53.31, 53.32, 53.36, 47.27, 47.5, 47.52, 47.53, 44.28, 44.29

(56) References Cited

U.S. PATENT DOCUMENTS 6,118,742 A * 9/2000 Matsui et al. ............ 369/47.48
6,172,952 B1 * 1/2001 Inokuchi et al. .......... 369/44.32
6,240,055 B1 * 5/2001 Takamine et al. ......... 369/44.29
6,292,448 B1 * 9/2001 Yoshida et al. ........... 369/53.27

* cited by examiner

Primary Examiner—Thang V. Tran
(74) Attorney, Agent, or Firm—Morgan, Lewis & Bockius LLP

(57) ABSTRACT

An apparatus for detecting an abnormal condition at the time of recording or reproducing information on information recording medium provided with: a detecting device for detecting control information to be detected every predetermined constant period in the information recording medium at least either at the time of recording or at the time of reproducing, the control information to control at least either the recording or the reproduction of the main information, and a determining device for determining that the abnormal condition occurs in either the recording or the reproduction, if no control information is detected every the predetermined constant period.

12 Claims, 12 Drawing Sheets

APPARATUS AND METHOD FOR DETECTING ABNORMAL CONDITION AT THE TIME OF RECORDING OR REPRODUCING INFORMATION ON INFORMATION RECORDING MEDIUM

BACKGROUND OF THE INVENTION

1. Field of the Invention

The present invention relates to apparatus and method for detecting an error status, and apparatus and method for recording information. More specifically, the present invention relates to the apparatus and the method for detecting the generation of the error at the time of recording main information to be recorded on an information recording medium or of reproducing the main information on the information recording medium.

2. Description of the Related Art

There are many conventional recording devices which records main information to be recorded on an information recording medium such as an optical disc as follows: the devices read address information recorded on the medium in advance. The address information indicates the recording position of the main information on the medium. Then the devices record the main information on the medium based on the address information.

Further, even at the time of reproducing the main information on the medium, the devices may read the address information at first. Then the devices search the main information on the medium based on the address information.

However, for example, at the time of recording the main information, the irradiated position by the light beam to be irradiated on the optical disc as the information recording medium is unexpectedly skipped from the position of the track to be correctly irradiated to a different position by reason of vibration and the like. This phenomenon is called a track skipping. If the track skipping is happened, the main information is recorded on the wrong position. Therefore another main information to be rightly recorded on the position is redundantly recorded.

If the main information is redundantly recorded, the reproduction of the information is incorrectly executed.

Therefore if the track skipping is happened, it is necessary to detect it immediately and to suspend reproducing and to restart recording on the right position.

In the conventional device, it is determined that the track skipping is happened when continuity of the address information is broken.

However, according to the conventional method of detecting the track skipping, it takes time to demodulate the address information and obtain information of the position to record.

Further, if the time to demodulate the address information and obtain the information of the position to record is longer than necessary time to record the amount of information corresponding to the maximum amount of information to be error-corrected at a time while the main information is reproduced, the main information is not correctly recorded as a unit of error correction. Therefore the error at the reproduction is not corrected, that leads to more serious problem.

SUMMARY OF THE INVENTION

It is therefore an object of the present invention to provide apparatus and method for detecting an error status, and apparatus and method for recording information which can promptly and accurately detect the error status, if the error status such as the track skipping and the like is happened at the time of recording or reproducing.

The above object of the present invention can be achieved by an apparatus for detecting an abnormal condition at the time of recording or reproducing information on information recording medium. The apparatus for detecting an abnormal condition at the time of recording or reproducing information on information recording medium is provided with: a detecting device for detecting control information to be detected every predetermined constant period in the information recording medium at least either at the time of recording or at the time of reproducing, the control information to control at least either the recording or the reproduction of the main information, and a determining device for determining that the abnormal condition occurs in either the recording or the reproduction, if no control information is detected every the predetermined constant period.

According to the apparatus for detecting an abnormal condition at the time of recording or reproducing information on information recording medium, the detecting device detects the control information to be detected every predetermined constant period in the information recording medium at least either at the time of recording or at the time of reproducing. The control information such as a pre-information is used for controlling at least either the recording or the reproduction of the main information. Then if no control information is detected every the predetermined constant period, the determining device determines that the abnormal condition occurs in either the recording or the reproduction.

Therefore the abnormal condition is promptly and accurately detected.

In one aspect of the apparatus for detecting the abnormal condition at the time of recording or reproducing information on information recording medium, said detecting device includes a generating device for generating a gate signal at the timing that the control information is to be detected in the information recording medium, and said determining device determines that the abnormal condition occurs if no control information is detected at the timing indicated by the gate signal.

According to this aspect, the apparatus can be simplified in its structure, and a presence or absence of the occurrence of the abnormal condition can be accurately detected.

In another aspect of the apparatus for detecting the abnormal condition at the time of recording or reproducing information on information recording medium, said determining device determines that the abnormal condition occurs if the probability that no control information is detected is higher than or equal to a predetermined threshold.

According to this aspect, an effect of a noise generated infrequently is eliminated and the presence or absence of the occurrence of the abnormal condition can be accurately detected.

In another aspect of the apparatus for detecting the abnormal condition at the time of recording or reproducing information on information recording medium, said determining device determines that the abnormal condition occurs if the probability that no control information is detected is higher than or equal to a predetermined threshold in a period to record or reproduce the amount of information corresponding to the maximum amount of information to be error-corrected at a time while the main information is reproduced.

According to this aspect, the abnormal condition can be detected soon, and an error correction at the time of reproduction is rightly executed.

In another aspect of the apparatus for detecting the abnormal condition at the time of recording or reproducing information on information recording medium, said information recording medium is an optical disc rotated at a constant linear velocity, and said control information is recorded every predetermined amount for the main information on the information recording medium in advance and includes at least address information indicating a recording position of the main information on the information recording medium.

According to this aspect, the presence or absence of the occurrence of the abnormal condition can be accurately detected.

In another aspect of the apparatus for detecting the abnormal condition at the time of recording or reproducing information on information recording medium, said abnormal condition is detected as a track skipping that a irradiated position by a light beam to be irradiated on an optical disc is unexpectedly skipped from a position of the track to be correctly irradiated to a different position.

According to this aspect, the presence or absence of the occurrence of the track skipping, which is likely to cause an abnormal of detection at the time of detecting the main information, can be accurately detected.

In another aspect of the apparatus for detecting the abnormal condition at the time of recording or reproducing information on information recording medium, said control information is used for controlling a recording of the main information on the information recording medium, and the apparatus further comprises a controlling device for controlling the recording of the main information on the information recording medium on the basis of the result of the determination by the determining device.

According to this aspect, the occurrence of the abnormal condition at the time of recording the main information can be promptly and accurately detected, and it is prevented that the recording of the main information is executed so that the abnormal condition occurs at the time of reproducing the main information.

The above object of the present invention can be achieved by method of detecting an abnormal condition at the time of recording or reproducing information on information recording medium. The method of detecting an abnormal condition at the time of recording or reproducing information on information recording medium is provided with: a detecting process of detecting control information to be detected every predetermined constant period in the information recording medium at least either at the time of recording or at the time of reproducing, the control information to control at least either the recording or the reproduction of the main information, and a determining process of determining that the abnormal condition occurs in either the recording or the reproduction, if no control information is detected every the predetermined constant period.

According to the method of detecting an abnormal condition at the time of recording or reproducing information on information recording medium, a detecting process detects control information to be detected every predetermined constant period in the information recording medium at least either at the time of recording or at the time of reproducing. The control information such as the pre-information is used for controlling at least either the recording or the reproduction of the main information. Then if no control information is detected every the predetermined constant period, a determining process determines that the abnormal condition occurs in either the recording or the reproduction.

Therefore the abnormal condition is promptly and accurately detected.

In one aspect of the method of detecting an abnormal condition at the time of recording or reproducing information on information recording medium, said detecting process includes a generating device for generating a gate signal at the timing that the control information is to be detected in the information recording medium, and said determining process determines that the abnormal condition occurs if no control information is detected at the timing indicated by the gate signal.

According to this aspect, the method can be simplified in its structure, and a presence or absence of the occurrence of the abnormal condition can be accurately detected.

In another aspect of the method of detecting an abnormal condition at the time of recording or reproducing information on information recording medium, said determining process determines that the abnormal condition occurs if the probability that no control information is detected is higher than or equal to a predetermined threshold.

According to this aspect, an effect of a noise generated infrequently is eliminated and the presence or absence of the occurrence of the abnormal condition can be accurately detected.

In another aspect of the method of detecting an abnormal condition at the time of recording or reproducing information on information recording medium, said determining process determines that the abnormal condition occurs if the probability that no control information is detected is higher than or equal to a predetermined threshold in a period to record or reproduce the amount of information corresponding to the maximum amount of information to be error-corrected at a time while the main information is reproduced.

According to this aspect, the abnormal condition can be detected soon. and an error correction at the time of reproduction is rightly executed.

In another aspect of the method of detecting an abnormal condition at the time of recording or reproducing information on information recording medium, said information recording medium is an optical disc rotated at a constant linear velocity, and said control information is recorded every predetermined amount for the main information on the information recording medium in advance and includes at least address information indicating a recording position of the main information on the information recording medium According to this aspect, the presence or absence of the occurrence of the abnormal condition can be accurately detected.

In another aspect of the method of detecting an abnormal condition at the time of recording or reproducing information on information recording medium, said abnormal condition is detected as a track skipping that a irradiated position by a light beam to be irradiated on an optical disc is unexpectedly skipped from a position of the track to be correctly irradiated to a different position.

According to this aspect, the presence or absence of the occurrence of the track skipping, which is likely to cause an abnormal of detection at the time of detecting the main information, can be accurately detected.

In another aspect of the method of detecting an abnormal condition at the time of recording or reproducing information on information recording medium, said control information is used for controlling a recording of the main information on the information recording medium, and the method further comprises a controlling process of controlling the recording of the main information on the information recording medium on the basis of the result of the determination by the determining process.

According to this aspect, the occurrence of the abnormal condition at the time of recording the main information can be promptly and accurately detected, and it is prevented that the recording of the main information is executed so that the abnormal condition occurs at the time of reproducing the main information.

DETAILED DESCRIPTION OF THE PREFERRED EMBODIMENTS

Referring to the accompanying drawings, an embodiment of the present invention will be explained.

In the embodiment, the present invention is adapted for an audio information outputting device for playing tunes in a place like the nightclub. Further the device includes a mixer which combines tunes outputted from a plurality of players and composes a tune for play.

(I) DVD-R

First, an embodiment of the DVD-R will be described with reference to FIGS. 1 and 2. The DVD-R is a storage medium on which the pre-pits corresponding to the pre-information are formed and the synchronization signal is recorded by forming the groove tracks wobbled at a predetermined frequency.

Figure 1:
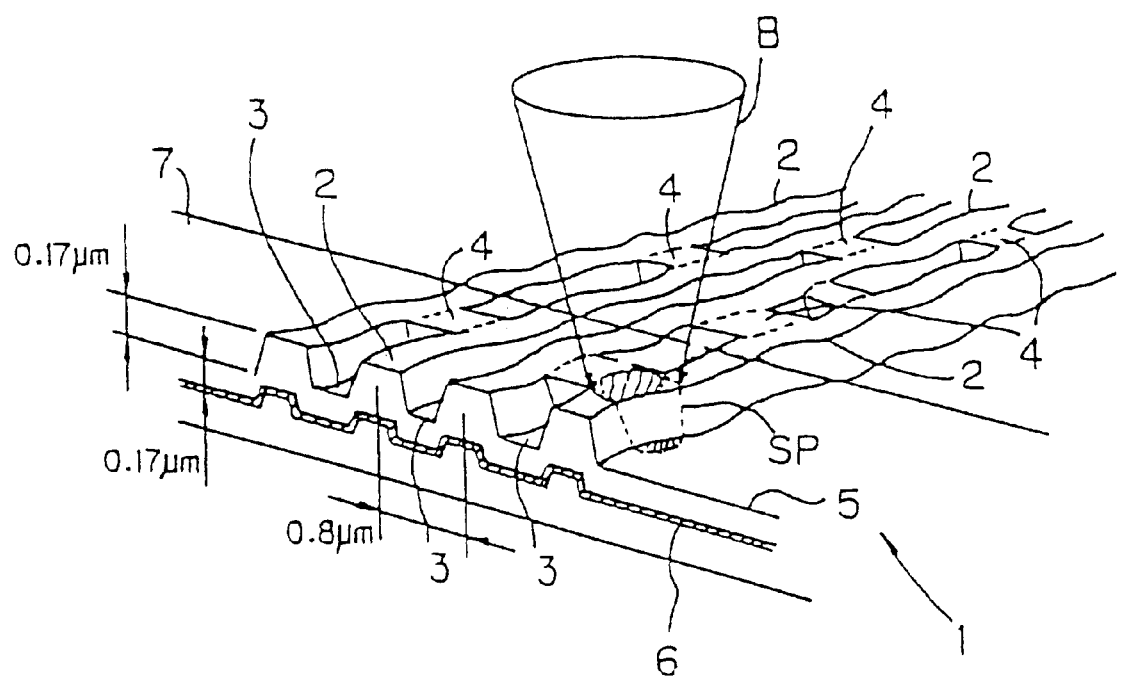
FIG. 1 is a perspective view illustrating the structure of DVD-R.

FIG. 1 is a perspective view showing the structure of the DVD-R. FIG. 2 is an example of recording format of the DVD-R.

First, the structure of the DVD-R according to the present invention will be described with referring to FIG. 1. In FIG. 1, the DVD-R is a write-once type dye DVD-R having the dye film 5, and is formed with the groove tracks 2 on which the recording information should be recorded and the land tracks 3 for guiding the laser beam B for recording and reproduction along the groove tracks 2. The DVD-R is conducted so as to obtain a constant linear velocity.

The DVD-R is further provided with the protection film 7 for protecting the groove tracks 2 and the land tracks 3, and the gold-deposition surface 6 for reflecting the light beam B at the time of reproducing the recorded information. The land track 3 are formed with the pre-pits 4 corresponding to the pre-information. The pre-pits 4 are formed before the DVD-R 1 is put on the market.

On the DVD-R 1, the groove tracks 2 are wobbled at the frequency corresponding to the rotation rate of the DVD-R 1. The recording of the synchronization signal for the rotation control of the DVD-R 1, by wobbling the groove track 2, is carried out before the DVD-R is put on the market, like the formation of the pre-pits 4.

When recording the main information (such as video and/or audio information to be recorded, other than the pre-information and the synchronization signal. The term "main information" will be used hereinafter for this meaning through this specification.), the information recording apparatus, described later in detail, detects the wobbling frequency of the groove tracks 2 to obtain the synchronization signal, thereby controlling the rotation of the DVD-R at the given rotation rate. Simultaneously, the information recording apparatus detects the pre-pits 4 to obtain the pre-information previously and sets the optimum output power of the light beam B based on the pre-information thus obtained, and obtains the address information indicated of the position on the DVD-R 1 where the main information is to be recorded. Thereafter, the information recording apparatus records the main information on the appropriate position on the DVD-R 1 based on the address information thus obtained.

The main information is recorded in such a manner that the light beam B is moved to trace, by its beam center, the center of the groove tracks 2 to form the information pits corresponding to the main information on the groove track 2.

As shown in FIG. 1, the size of the light spot B is determined so that the light spot 8 covers not only the groove tracks 2 but partially the land tracks 3. Using the reflected portion of the light spot 8 from the land tracks 3 with the push-pull method, the pre-information is detected from the pre-pits 4. In this case, the above push-pull method uses the photodetectors divided by the diving lines parallel to the rotation direction of the DVD-R 1, and this method will be referred to as radial push-pull method. Further, from the reflected portion of the light spot 8 from the groove track 2, the wobbling signal is detected to obtain the clock signal (such as the synchronization signal) used for the rotation control.

Next, the recording format of the pre-information and the information of the rotation control and the main information recorded beforehand on the DVD-R 1 according to the present invention will be described with reference to FIG. 2.

Figure 2:
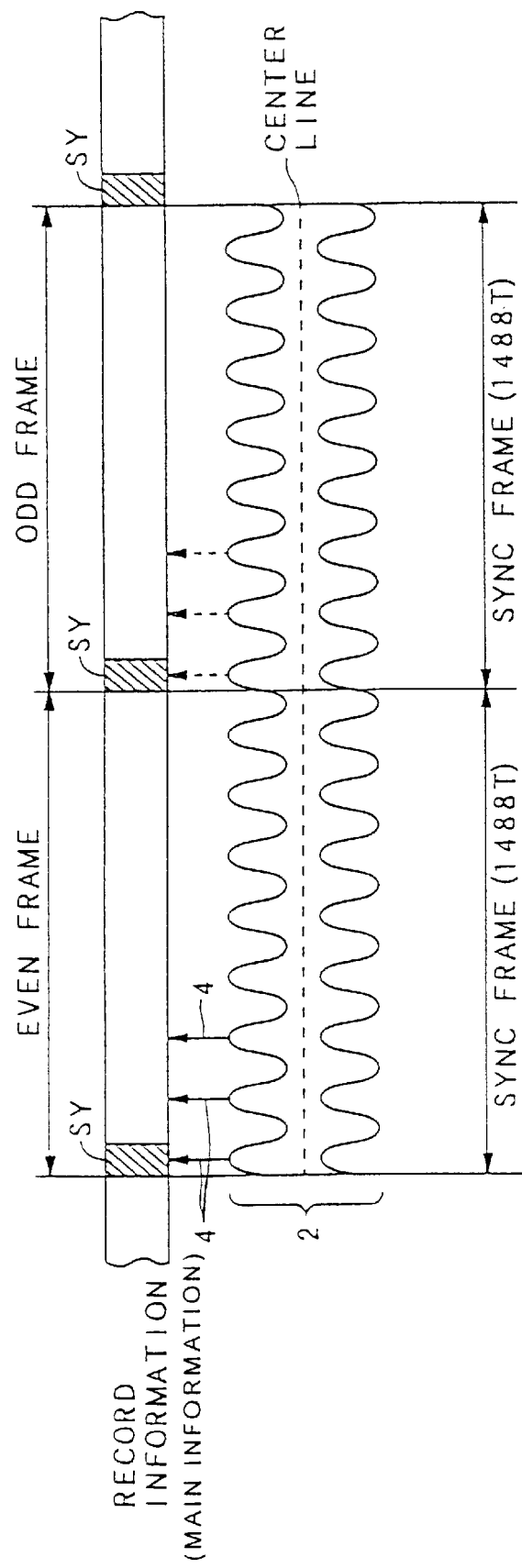
FIG. 2 is a diagram illustrating the recording format of the DVD-R.

In FIG. 2, the upper part of the illustration represents the recording format of the main information, and the lower part of illustration in the form of the waveform represents the wobbling state of the groove track 2 (plan view of the groove track 2) on which the main information is to be recorded. The upward arrows between the main information and the wobbling state of the groove track 2 schematically represent the positions where the pre-pits 4 are formed.

It is noted that, in FIG. 2, the wobbling state of the groove track 2 is illustrated to have larger magnitude than it really is, to assist the understanding of the reader. The main information is recorded on the center line of the groove track 2.

As shown in FIG. 2, the main information to be recorded on the DVD-R is divided, in advance, into a plurality of sync frames. Twenty six sync frames constitute one recording sector which serves as a unit information, and sixteen recording sectors constitute one ECC (Error Correction Code) block which serves as a unit of error correction at the time of reproduction.

One sync frame has a length (i.e., 1488T) of 1488 times longer than a unit length T which corresponds to the bit interval prescribed by the recording format in recording the main information. The sync frame includes the sync information SY, having the length of 14 T at its leading portion, which is used for establishing the synchronization of the respective sync frames.

The pre-information, recorded on the DVD-R 1 according to the present invention, is recorded in every sync frame. When recording the pre-information in the form of pre-pits 4, one pre-pit 4 indicating the sync signal in the pre-information (the sync signal is hereinafter called a sync code to distinguish it from the sync signal for the rotation control of the DVD-R) is necessarily formed on the land track 3 adjacent to the area of each sync frame in the main information where the sync information SY is recorded. Further, one or two additional pre-pits 4 are formed on the land track 3 at the position adjacent to the leading portion of the sync frame other than the sync information SY, so as to indicate the contents (address information) of the pre-information to be recorded. It is noted that, in some cases, no pre-pit 4 may be recorded at the front half portion of the sync frame except for the sync information SY, depending of the contents of the pre-information to be recorded. In the first sync frame (EVEN frame as mentioned below) in one recording sector, three pre-pits 4 are consequently formed at the front half portion of the sync frame.

In the DVD-R of the present invention, the pre-pits 4 may be formed only in one of the even numbered sync frames (hereinafter referred to as "EVEN frame") and the odd numbered sync frames (hereinafter referred to as "ODD frame") to record pre-information. In this embodiment, the pre-pits 4 are formed in the EVEN frames (as shown by the solid arrows in FIG. 2), but no pre-pits 4 is formed in the ODD frames adjacent thereto (as shown by the broken arrows in FIG. 2).

Further, the pre-pit 4 is formed in the position that the amplitude of the wobbling becomes maximum.

The relationship between the position that the pre-pit 4 is formed and the contents of the pre-information in the pre-pit 4 will be specifically explained. In the following explanation, the pre-pit 4 formed on the land track 3 which is next to the area the synchronous information SY is recorded is indicated as "pre-pit B2". The pre-pits 4 formed on the land track 3 which is next to the front side of the sync frame other than the the synchronous information SY are indicated as "pre-pit B1" and "pre-pit B0" in order of the arrangement from the head.

As shown in the following table, all pre-pits B2 to B0 are formed at the position corresponding to the sync code in the EVEN frame which is located at the head of the one recording sector. Further, only the pre-pit B2 and B1 are formed at the position corresponding to the sync code in the ODD frame. Moreover, only the pre-pits B2 and B0 are formed at the position corresponding to data "1" as the pre-information other than the sync code. Furthermore, only the pre-pit B2 is formed at the position corresponding to data "0" as the pre-information other than the sync code.

TABLE 1

| pre-pit contents | B2 | B1 | B0 |
|---|---|---|---|
| sync code of EVEN frame | 1 | 1 | 1 |
| sync code of ODD frame | 1 | 0 | 0 |
| pre-information data "1" | 1 | 0 | 1 |
| pre-information data "0" | 1 | 0 | 0 |

The groove track 2 is wobbled at the constant wobbling frequency of about 140 kHz, which is determined such that one sync frame corresponds to 8 waves of varying wave forms of the groove track 2. The above mentioned information recording apparatus detects the wobbling signal having the constant wobbling frequency thereby to detect the signal used for the rotation control of the spindle motor.

(II) Configuration and Operation of the Information Recording Apparatus

An embodiment of the information recording apparatus of the present invention will be described with reference to FIGS. 3 to 13. The information recording apparatus records the main information on the DVD-R having the above-mentioned feature.

Figure 3:
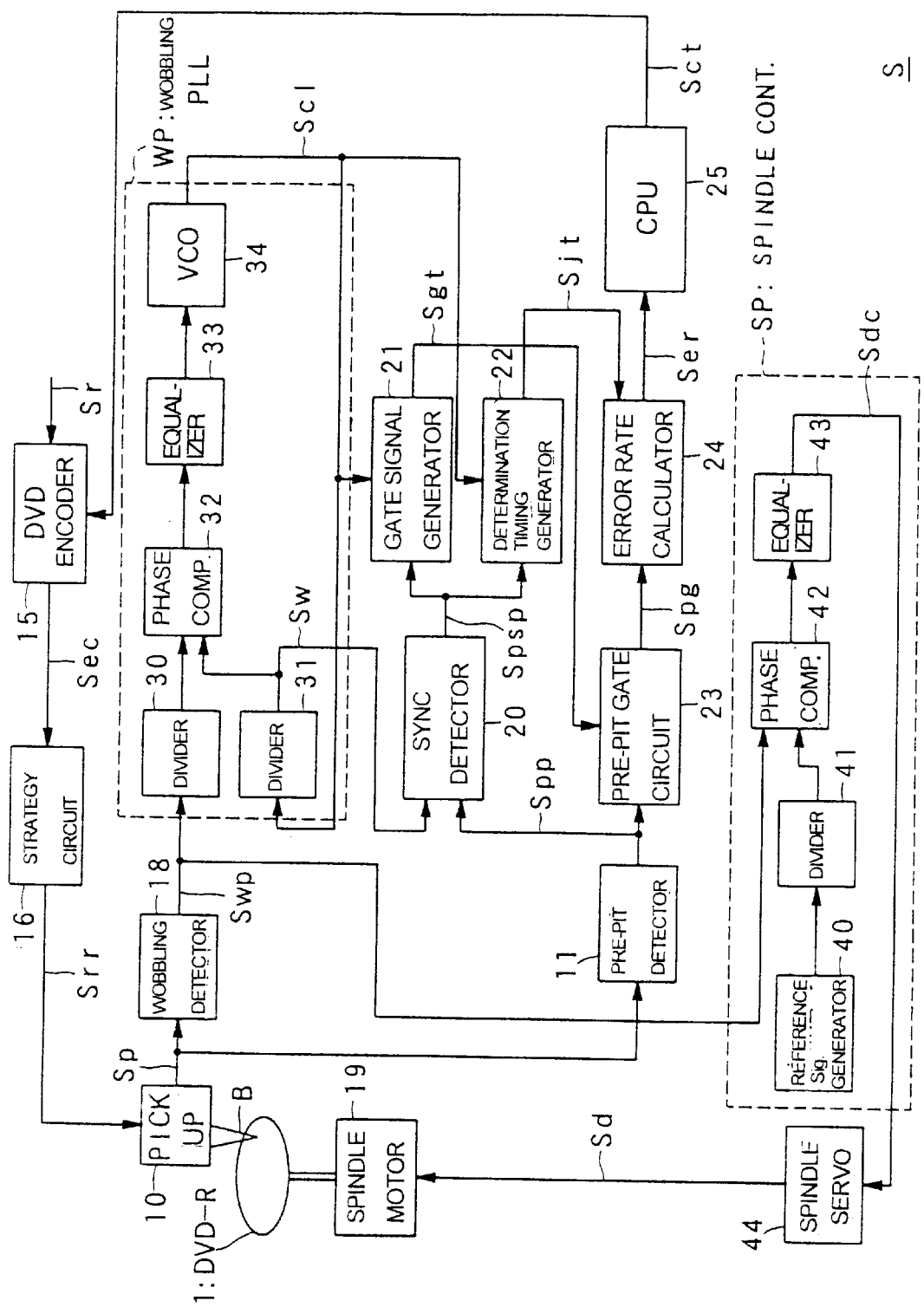
FIG. 3 is a block diagram illustrating the outline structure of the information recording apparatus.

First, the whole structure of the information recording apparatus of the present invention will be described with reference to FIG. 3. FIG. 3 is a block diagram showing the whole structure of the information recording apparatus of the present invention.

As shown in FIG. 3, the information recording apparatus S according to this embodiment includes a pickup 10, a pre-pit detector 11, a DVD encoder 15, a strategy circuit 16, a wobbling detector 18, a spindle motor 19, a sync detector 20, a gate signal generating circuit 21, a determination timing generator 22, a pre-pit gate circuit 23, an error rate counter 24, a CPU 25, a spindle servo circuit 44, a wobbling PLL (Phase Locked Loop) WP and a spindle controller SP.

The wobbling PLL WP includes dividers 30 and 31, a phase comparator 32, an equalizer 33 and VCO (Voltage Controlled Oscillator) 34.

The spindle controller SP includes a reference signal generator 40, a divider 41, a phase comparator 42 and an equalizer 43.

Figure 4:
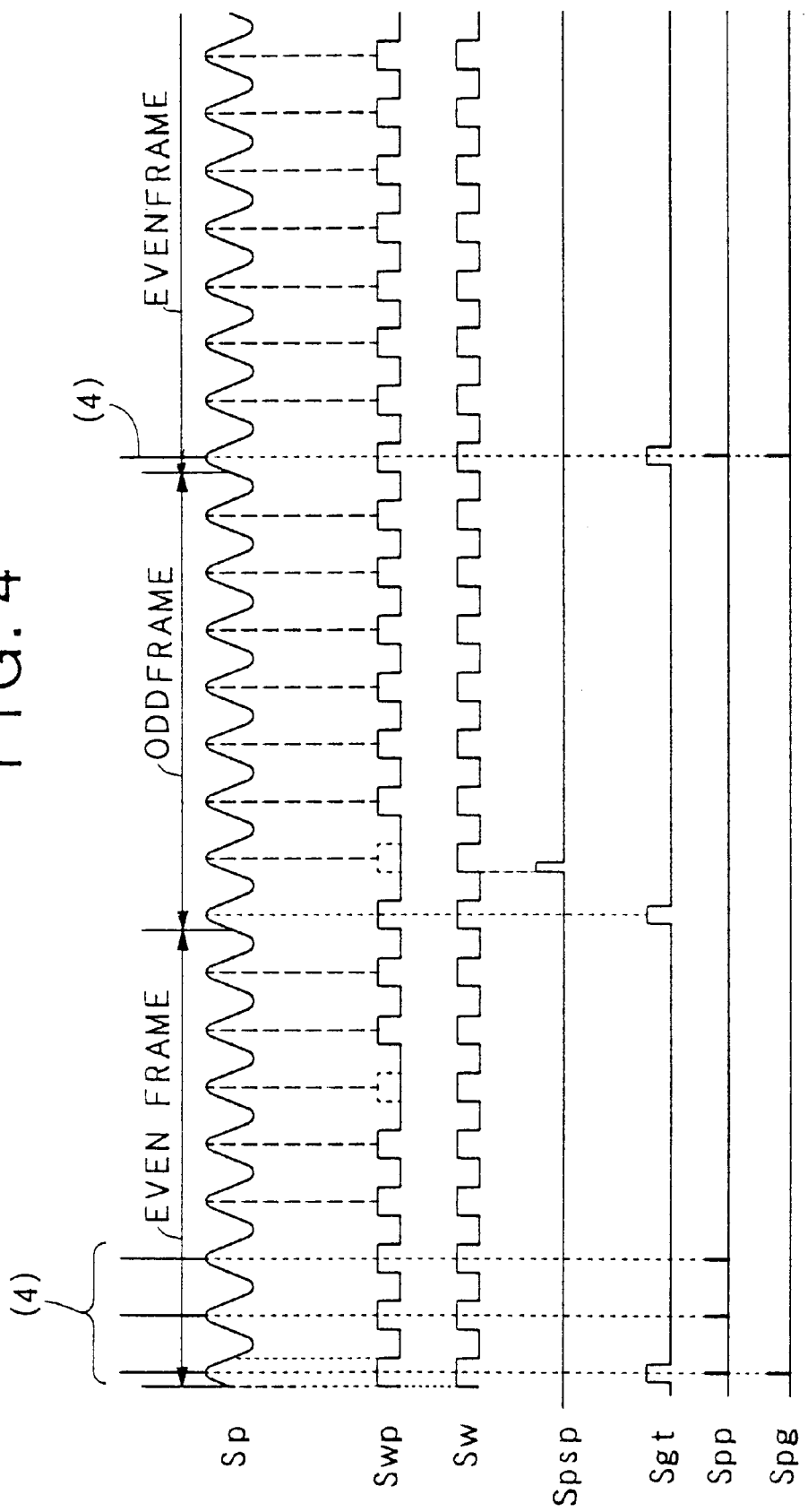
FIG. 4 is a flow diagram illustrating the operation of the information recording apparatus.

Next, the whole operation of the information recording apparatus S will be described with reference to FIGS. 3 and 4. FIG. 4 is a flow diagram showing the whole operation.

The recording data Sr serving as the main information is supplied from an external device to the DVD encoder 15. Then the recording data Sr is modulated under the eight to sixteen modulation scheme based on a clock signal, which is not shown in FIG. 3, and the below-mentioned control signal Sct by the DVD encoder 15, and supplied to the strategy circuit 16 as a modulation signal Sec. Further, a waveform of the modulation signal Sec is converted into that of a recording signal Srr by the strategy circuit 16 in order to adjust a form of a recording pit formed on the DVD-R 1 based on the clock signal. Then the recording signal Srr is supplied to the pickup 10.

The pickup 10 irradiates the light beam B whose intensity is modulated by the recording signal Srr on the groove track 2 where the recording pit is to be formed corresponding to the recording signal Sr.

The pickup 10 irradiates the light beam B as shown in FIG. 1 in advance of forming the recording pit corresponding to the recording signal Sr. Then the pickup 10 receives the reflected light of the light beam B modulated based on the pre-pits 4 and the wobbling of the groove track 2, and generates a detection signal Sp including the information of the pre-pits 4 and the wobbling of the groove track 2. Then the pickup 10 outputs the detecting signal Sp to the pre-pit detector 11 and the wobbling detector 18.

The detecting signal Sp has a frequency (about 140 kHz) corresponding to the wobbling of the groove track 2 as shown in the top part of FIG. 4, and has a waveform like an impulse indicated by (4) in FIG. 4 at the timing which the pre-pit 4 is formed.

The wobbling detector 18 generates a wobbling detecting signal Swp (shown in the second part from the top of the FIG. 4) corresponding to the wobbling of the groove track 2 based on the detecting signal Sp, and outputs the wobbling detecting signal Swp to the divider 30 in the wobbling PLL WP and the phase comparator 42 in the spindle controller SP.

The wobbling signal Swp can be have no pulse at the timing which the pulse is to be detected under the influence of a surface flaw of the DVD-R 1 as shown by a dotted line in the second part from the top of FIG. 4.

The wobbling PLL WP, where the wobbling detecting signal Swp is supplied, generates a clock signal Scl based on the wobbling detecting signal Swp, which is synchronized with the wobbling frequency of the groove track 2 and has a frequency corresponding to an inverse number of the "T". Then the wobbling PLL WP outputs the clock signal Scl to the gate signal generating circuit 21 and the determination timing generator 22 and outputs the clock signal Scl to the divider 31 again for feedback.

In the wobbling PLL WP, the phase comparator 32 compares the phase between the signal divided the clock signal Scl into by the divider 31 and the signal divided the wobbling signal Swp into by the divider 30. The former signal has the frequency which accurately equals to an original wobbling frequency, and hereinafter is called a wobbling signal Sw as shown in the third part of FIG. 4. Then in the wobbling PLL WP a frequency of the signal obtained by the comparison is regulated by the equalizer 33, and the VCO 34 is driven by using the signal. Then the VCO 34 generates the clock signal Scl. According to the above-mentioned operation of the wobbling PLL WP, if there are some missing pulses in the wobbling detecting signal Swp as shown by dotted lines in the second part from the top of FIG. 4, The wobbling signal Sw and the clock signal Scl are generated as signals compensated for the missing pulses as shown in the third part from the top of FIG. 4.

Further, the wobbling signal Sw is supplied to the sync detector 20 in addition to the phase comparator 32.

The spindle controller SP, where the wobbling detecting signal is supplied, generates a drive control signal Sdc used for controlling the number of revolutions of the spindle motor 19 based on the wobbling detecting signal Swp, and outputs the drive control signal Sdc to the spindle servo circuit 44. Then the spindle servo circuit 44 generates a drive signal Sd used for activating the spindle motor 19 so that the DVD-R rotates at a constant linear velocity, and outputs drive signal Sd to the spindle motor 19.

In the spindle controller SP, a reference signal for activating the spindle motor 19 generated by the reference signal generator 40 is divided by the divider 41. Then the phase comparator 42 compares the phase between the divided signal and the wobbling detecting signal Swp. The equalizer 43 regulates a frequency response of the signal obtained by the comparison, and generates the drive control signal Sdc.

The pre-pit detector 11 extracts a pre-pit signal Spp, which corresponding to the pre-pit 4 included in the detecting signal Sp as shown the second part of the bottom of FIG. 4, according to radial push-pull method, and outputs the pre-pit signal Spp to the pre-pit gate circuit 23 and the sync detector 20.

The sync detector 20 generate a position signal Spsp by the below-mentioned operation, and outputs the position signal Spsp to the gate signal generate circuit 21 by using the supplied pre-pit signal and wobbling signal, and the determination timing generator 22. The position signal Spsp, indicating the timing of the sync code in each sync frame as shown in the fourth part from the top of FIG. 4, is used for generating a gate signal Sgt by the gate signal generating circuit 21. The gate signal Sgt indicates the timing when the pre-pit signal Spp corresponding to the lead pre-pit 4 in each sync frame, is duly generated. The lead pre-pit 4 corresponds to the pre-pit B2 in the table 1.

The gate signal generating circuit 21 generates the gate signal Sgt according to the below-mentioned operation by using the clock signal Scl and the position signal Sps as shown in the third part from the bottom of FIG. 4, and outputs the gate signal Sgt to the pre-pit gate circuit 23.

The pre-pit gate circuit 23 applies the supplied gate signal Sgt to the pre-pit signal Spp, and generates a pre-pit gate signal Spg serving as an impulse signal as shown in the bottom part of FIG. 4 in the case that the pre-pit signal Spp corresponding to the pre-pit 132 is supplied to the pre-pit gate circuit 23 while the gate signal Sgt indicates high level. Further, the pre-pit gate circuit 23 outputs the pre-pit gate signal Spg to the error rate counter 24.

The pre-pit gate signal Spg is generated only when the pre-pit signal Spp corresponding to the pre-pit B2 is normally detected (i.e., the pre-pit signal Spp is detected while the gate signal Sgt indicates high level.). Therefore if the pre-pit signal Spp is generated at the different timing from the regular timing, the pre-pit gate signal Spg is not generated.

The determination timing generator 22, where the clock signal Scl and the position signal Spsp are supplied, generates a determination timing signal Sjt according to the below-mentioned operation, which indicates the timing of determining whether the pre-pit signal Spp is normally detected in the below-mentioned error rate counter 24 by using the clock signal Scl and the position signal Spsp, and outputs the determination timing signal Sjt to the error rate counter 24.

The error rate counter 24 generates an error rate signal Ser indicating the rate of the detection of the pre-pit signal Spp at the incorrect timing (i.e., the rate of occurrence of the track-skipping) according to the below-mentioned operation by using the pre-pit gate signal Spg and the determination timing signal Sjt, and outputs the error rate signal Ser to the CPU 25.

The CPU 25 determines whether the track-skipping occurs according to the below-mentioned operation based on the rate indicated by the error rate signal Ser, and generates the control signal Sct for controlling the DVD encoder 15 so that the output of the modulation signal Sec from the DVD encoder 15 is stopped if the track-skipping occurs. If the recording is carried on in that case, recording is done on the incorrect groove track other than the correct groove track to be recorded. The CPU 25 outputs the control signal Sct to the DVD encoder 15.

Therefore the occurrence of the abnormal condition of the reproduction at the time of the reproduction, caused by recording the main information on incorrect groove track 2 which is not to be used for recording in the case that the above-mentioned track-skipping occurs, is avoided.

Next, the detail configuration and operation of the sync detector 20 will be described with reference to FIGS. 5 and 6.

Figure 5:
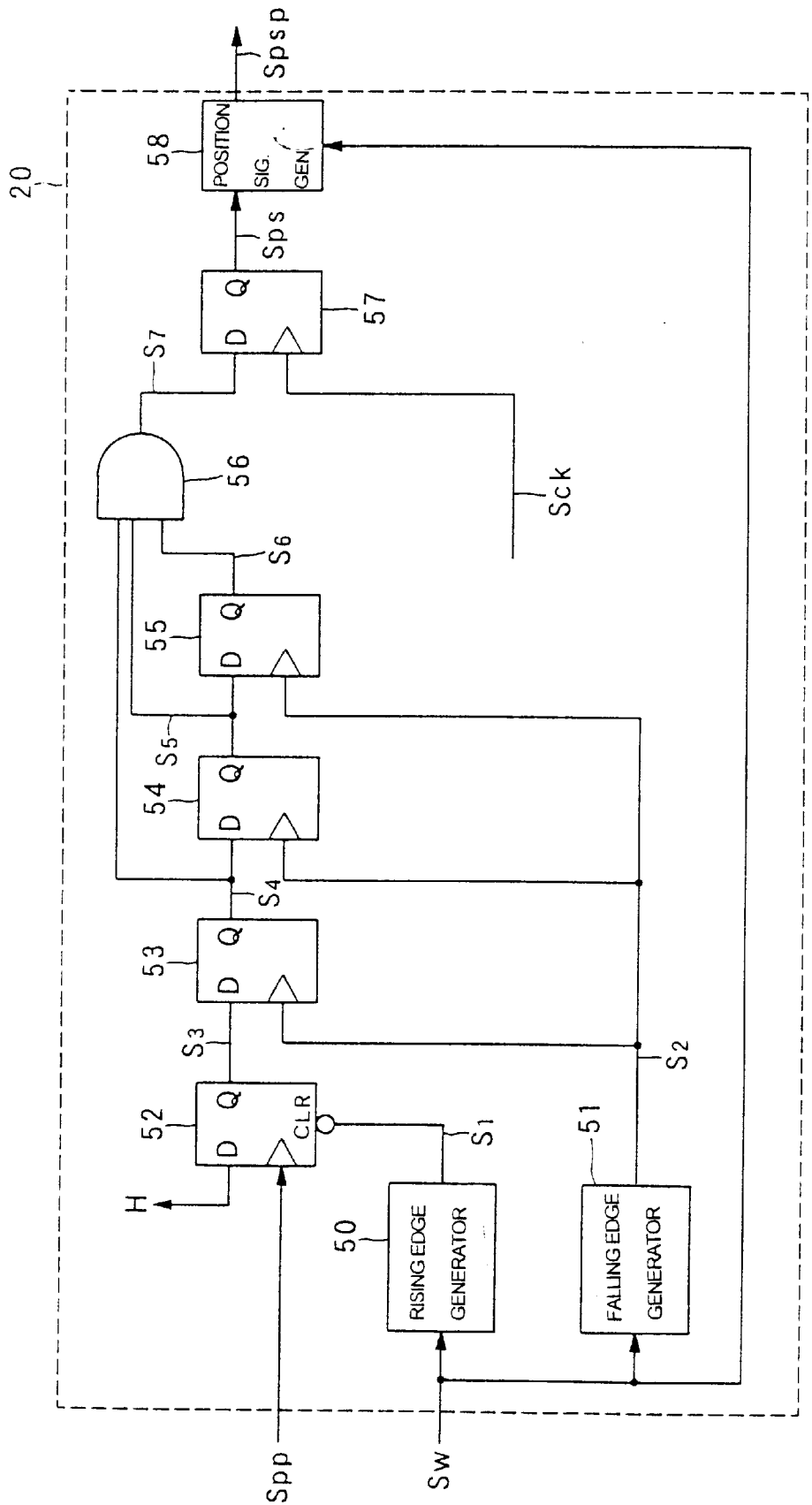
FIG. 5 is a block diagram illustrating the outline structure of a sync detector.

FIG. 5 is a block diagram showing the outline structure of the sync detector 20. FIG. 6 is a timing diagram showing the operation of the sync detector 20.

As shown in FIG. 5, the sync detector 20 includes a rising edge generating circuit 50, a falling edge generating circuit 51, D-type flip-flop circuits 52, 53, 54, 55, and 57, an AND circuit 56 and a position signal generator 58.

Next, the operation will be described with reference to FIG. 6.

Three pre-pits 4 corresponding to the sync code of the first EVEN frame in one recording sector are consequently formed at the position where the amplitude of wobbling of groove track 2 becomes maximum. Therefore the sync detector 20 detects the pre-pit 4 indicating the sync code of the EVEN frame by finding the three pre-pits 4 formed consequently, and generates the position signal Spsp indicating the timing of the sync code.

Figure 6:
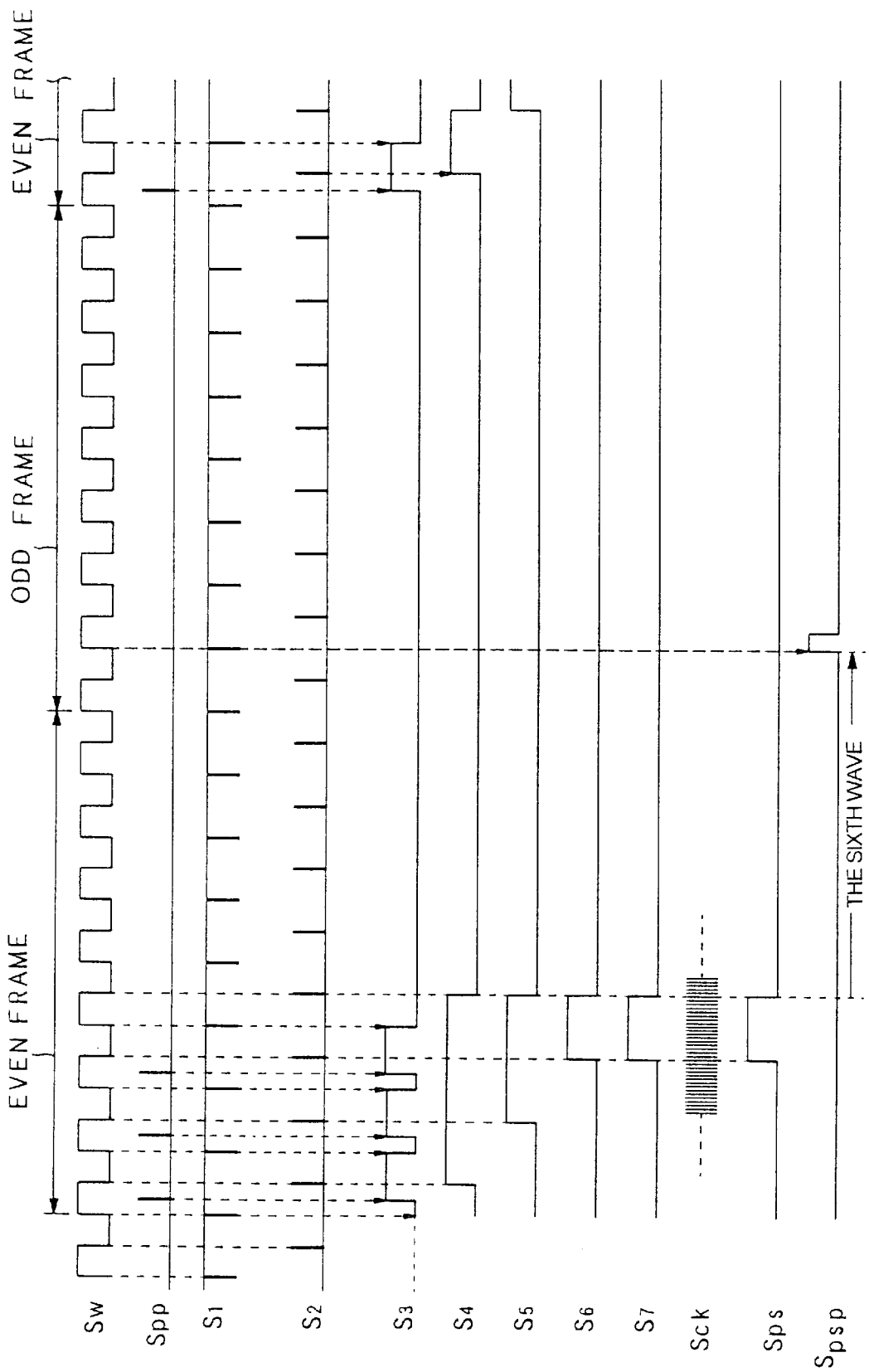
FIG. 6 is a timing chart illustrating the operation of the sync detector.

In the sync detector 20, the rising timing of the wobbling signal Sw supplied by the rising edge generating circuit 50 is detected by the rising edge generating circuit 50, and supplied to a clear terminal of the flip-flop circuit 52 as a rising signal $S_1$ as shown in the third part of top of FIG. 6.

Paralleling that operation, the falling timing of the wobbling signal Sw supplied to the falling edge generating circuit 51 is detected by the falling edge generating circuit 51, and supplied to clock terminals of the flip-flop circuits 53, 54, and 55 as a falling signal $S_2$ as shown in the fourth part from the top of FIG. 6.

The output of the flip-flop circuit 52 where the pre-pit signal Spp is supplied becomes HIGH when the pre-pit signal Spp is supplied, and maintains HIGH until the next rising signal $S_1$ is supplied. Accordingly, a timing signal $S_3$ including three consecutive pulses as shown in FIG. 6 is generated at the timing when the first EVEN frame of one recording sector is supplied as shown in the fifth part from the top of FIG. 6.

The flip-flop circuit 53 where the timing signal $S_3$ is supplied generates a timing signal $S_4$ as shown in the sixth part from the top of FIG. 6. Then the flip-flop circuit 53 outputs the timing signal $S_4$ to the flip-flop circuit 54, and to one terminal of three-input AND circuit 56. The timing signal $S_4$ indicates HIGH in the period from the first timing when the falling signal $S_2$, supplied to the clock terminal of the flip-flop circuit 53, makes a LOW to HIGH transition while the timing signal $S_3$ indicates HIGH to the timing when the falling signal $S_2$ makes a LOW to HIGH transition while the timing signal S3 indicates LOW.

The flip-flop circuit 54 where the timing signal $S_4$ is supplied generates a timing signal $S_5$ as shown in the sixth part from the bottom of FIG. 6. Then the flip-flop circuit 54 outputs the timing signal $S_5$ to the flip-flop circuit 55, and to another terminal of the AND circuit 56. The timing signal $S_5$ indicates HIGH in the period from the first timing when the falling signal $S_2$ makes a LOW to HIGH transition while the timing signal $S_4$ indicates HIGH to the timing when the falling signal $S_2$ makes a LOW to HIGH transition while the timing signal $S_4$ makes a HIGH to LOW transition.

The flip-flop circuit 55 where the timing signal $S_5$ is supplied generates a timing signal $S_6$ as shown in the fifth part from the bottom of FIG. 6. Then the flip-flop circuit 55 outputs the timing signal $S_6$ to the flip-flop circuit 56, and to the other terminal of the AND circuit 56. The timing signal $S_6$ indicates HIGH in the period from the first timing when the falling signal $S_2$ makes a LOW to HIGH transition while the timing signal $S_5$ indicates HIGH to the timing when the falling signal $S_2$ makes a LOW to HIGH transition while the timing signal $S_4$ and $S_5$ make a HIGH to LOW transition.

The AND circuit 56 carries out the logical AND between the timing signal $S_4$, the timing signal $S_5$, and the timing signal $S_6$, and generates the timing signal $S_7$ as shown in the fourth part from the bottom of FIG. 6.

In the sync generator 20 whose structure is shown in FIG. 5, the timing signal $S_7$ is not generated unless the three consecutive pre-pits 4 are not detected. Accordingly, if the timing signal $S_7$ indicates HIGH, the three consecutive pre-pits 4 detected just before the timing signal $S_7$ becomes HIGH indicates the timing of sync code in the EVEN frame.

The flip-flop circuit 57 brings the timing signal $S_7$ into sync with the clock signal Sck on which the operation of the whole of the information recording apparatus is based, and generates a detecting sync signal Sps.

In a counter of the position signal generator 58, which is not shown, the count of the pulse of the wobbling signal Sw is started from the pulse of the wobbling signal Sw supplied at first after the sync signal Sps makes a HIGH to LOW transition, and at the timing of the sixth pulse of the wobbling signal Sw, the position signal Spsp which indicates HIGH is generated.

According to the above-mentioned operation of the sync detector 20, the position signal Spsp becomes HIGH at the timing of the sixth pulse of the wobbling signal from the sync code of the EVEN frame. Accordingly, the position signal Spsp respectively makes a LOW to HIGH transition in sync with the pulse of the wobbling signal Sw generated just before the timing corresponding to the pre-pit B2 in the second sync frame from the head in each recording sector.

The above-mentioned sync detector 20 detects the pre-pit 4 indicating the sync code in the EVEN frame, and generates the position signal Spsp. In addition to that, the position signal Spsp may be generated by detecting the pre-pit 4 indicating the sync code in the ODD frame.

Next, the detail configuration and operation will be described with reference to FIGS. 7 and 8.

Figure 7:
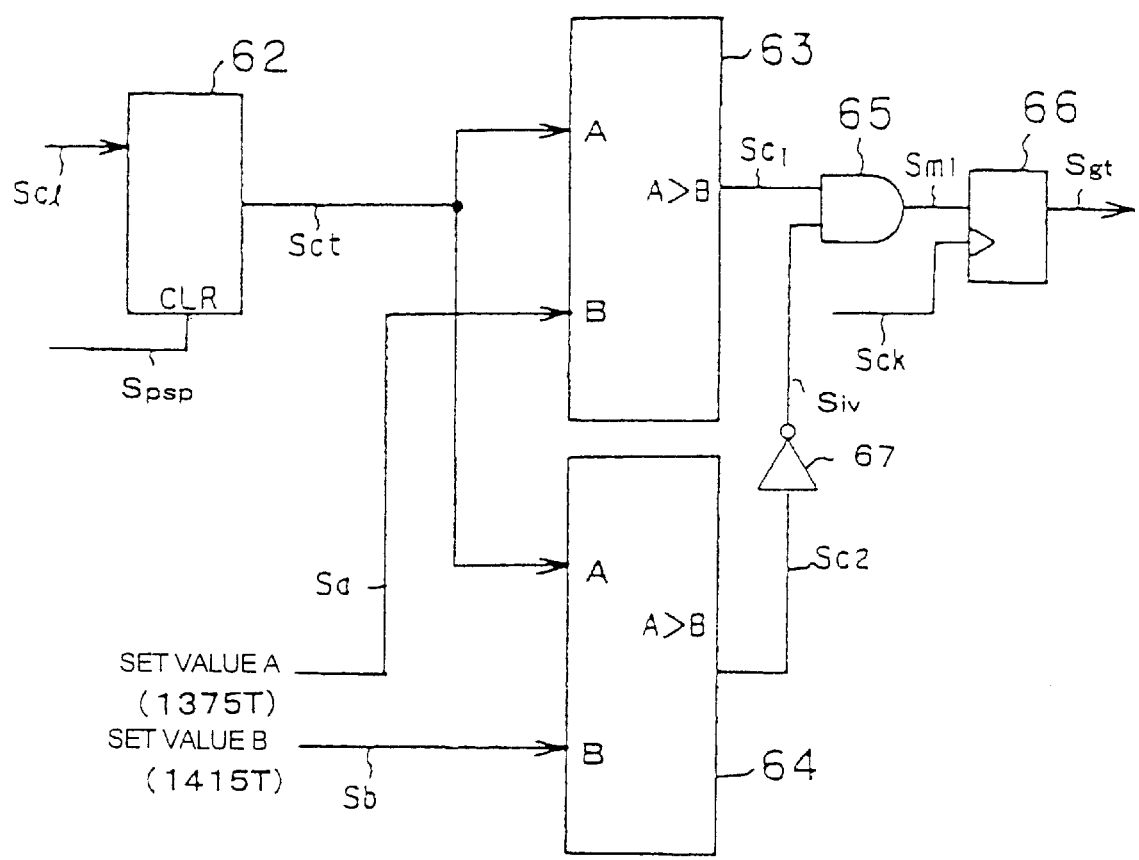
FIG. 7 is a block diagram illustrating the outline structure of a gate signal generator.

FIG. 7 is a block diagram showing the outline structure of the gate signal generator 21. FIG. 8 is a timing diagram showing the operation.

As shown in FIG. 7, the gate signal generator 21 includes a counter 62, which is a so-called free-run counter repeatedly counting the period of 1488T, comparators 63 and 64, an AND circuit 65, D-type flip-flop circuit 66 and an inverter 67.

Next, the operation will be decribed.

The counter 62 is reset when the pulse of the position signal Spsp is supplied, and counts 1488 pulses, each of which is included in the clock signal Scl and has a period of "T". Then the counter 62 is automatically reset to initial count value "0" after counting the pulses included in the clock signal Scl corresponding to 1488T, and starts to count the pulse included in the clock signal Scl again. The counter 62 repeatedly executes this operation. Accordingly, the counter 62 outputs a counter signal Sct including the count value which changes as a saw-tooth wave as shown in the fourth part of FIG. 8. The position signal Spsp has a function of defining an initial phase of the count signal Sct having the saw-tooth wave.

Figure 8:
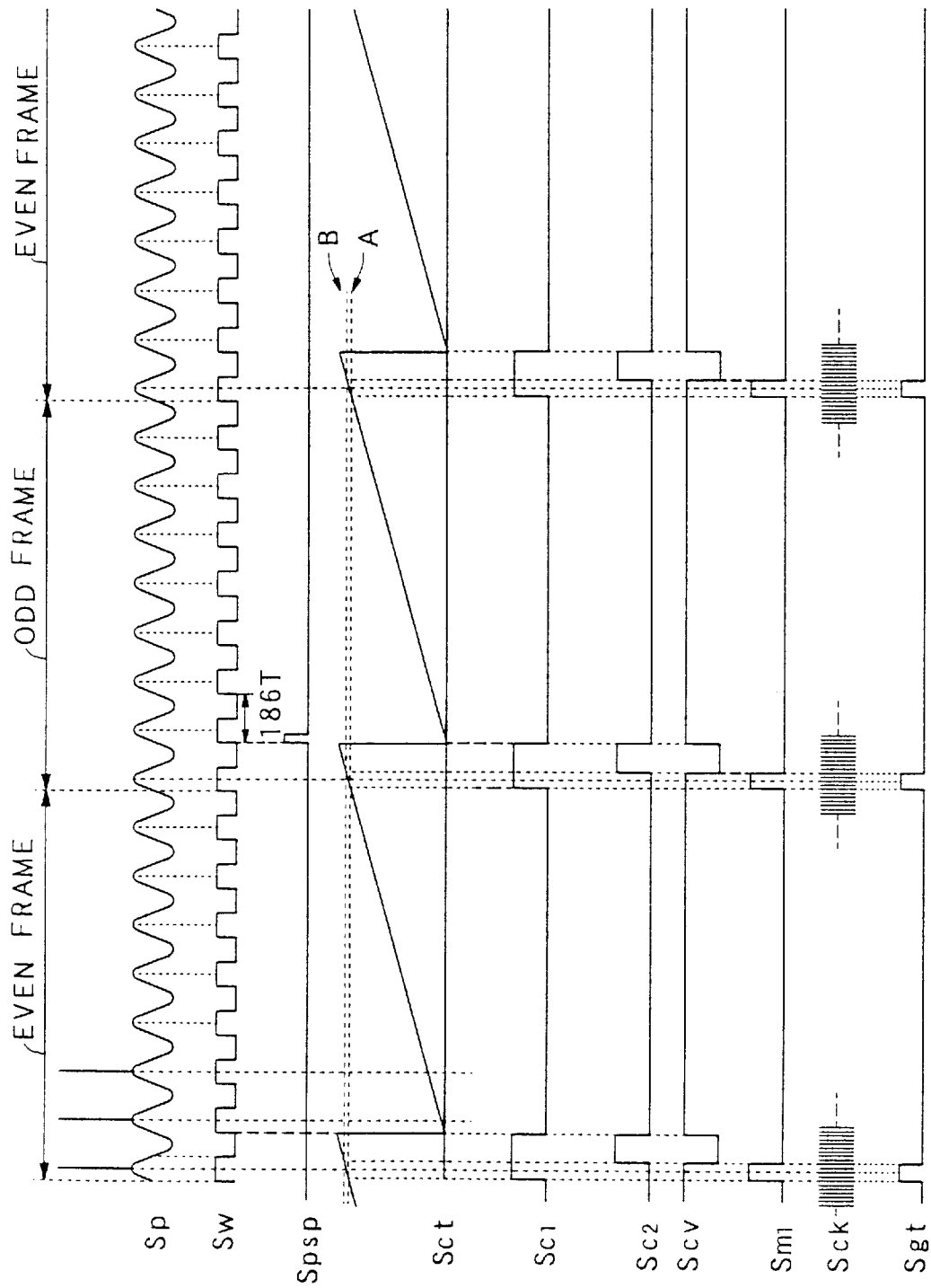
FIG. 8 is a timing chart illustrating the operation of the gate signal generator.

The comparator 63, where the count signal Sct is supplied, always compares the count value of the count signal Sct and the set value signal Sa corresponding to a predetermined set value "A", and generates a compare signal $Sc_1$ which indicates HIGH in the period from the timing when the count value becomes larger than the set value "A" to the timing when the count value of the count signal Sct returns to "0" as shown in the sixth part from the bottom of FIG. 8. Then the comparator 63 outputs compare signal $Sc_1$ to one terminal of the AND circuit 65.

The set value "A" is used for setting the rising timing of the gate signal Sgt so that the head pre-pit 4 of each sync frame includes the timing of that to be duly detected Specifically, the set value "A" indicates the timing when the count value is counted until 1375T after the count signal Sct is initialized (i.e., after the count value becomes "0").

The comparator 64, where the count signal Sct is supplied, always compares the count value of the count signal Sct and the set value signal Sb corresponding to a predetermined set value "B", and generates a compare signal $Sc_2$ which indicates HIGH in the period from the timing when the count value becomes larger than the set value "B" to the timing when the count value of the count signal Sct returns to "0" as shown in the fifth part from the bottom of FIG. 8. Then the comparator 63 outputs compare signal $Sc_1$ to the inverter 67.

The set value "B" is used for setting the falling timing of the gate signal Sgt so that the head pre-pit 4 of each sync frame includes the timing of that to be duly detected. Specifically, the set value "B" indicates the timing when the count value is counted until 1415T after the count signal Sct is initialized.

The reason why the set value "A" becomes 1375T and the set value "B" becomes 1415T is described as follows:

First, one period of the wobbling signal Sw in one sync frame is 186T (1488T/8) as shown in FIG. 8. Next, the head pre-pit 4 (pre-pit B2) in each sync frame is to be detected as the detecting signal Sp at the center of the pulse the eighth wobbling signal Sw from generating the pulse of the wobbling signal Sw in sync with one pulse of the position signal Spsp as shown in the top of FIG. 8. Moreover, the range between for 20T prior to and for 20T subsequent to the center of the pulse of the eighth wobbling signal Sw is a generating range of detecting error of the pre-pit B2. Specifically, a phase shift between the wobbling signal Sw and the detecting signal Sp based on the pre-pit 4 is generated according to crosstalk caused when the wobbling signal Sw is generated. Accordingly, the rising timing of the gate signal Sgt indicating the period when the pre-pit B2 is to be detected is indicated as the timing after the prescribed period from the timing when the count signal Sct is "0". The prescribed period is described as follows:

$$186T \times 7 + (186T/2) - 20T = 1375T$$

The falling timing of the gate signal Sgt is indicated as the timing after the prescribed period from the timing when the count signal Sct is "0". The prescribed period is described as follows:

$$186T \times 8 - (186T/2) + 20T = 1415T$$

The inverter 67 inverts the compare signal $Sc_2$, and generates a inverse compare signal Siv as shown in the fourth part from the bottom of FIG. 8. The the inverter 67 outputs the inverse compare signal Siv to another terminal of the AND circuit 65.

The AND circuit 56, where the compare signal $Sc_1$ and the compare signal $Sc_1$ are supplied, carries out the logical AND between the compare signal $Sc_1$, and the inverse compare signal Siv as shown in the third part from the bottom of FIG. 8, and generates a logical AND signal $Sm_1$.

Then the AND circuit 56 outputs the logical AND signal $Sm_1$ to the flip-flop circuit 66.

The flip-flop circuit 66 brings the logical AND signal $Sm_1$ into sync with the clock signal Sck, and generates the gate signal Sgt indicating the timing when the head pre-pit 4 is duly detected.

Next, the detail configuration and operation of the determination timing generator 22 will be described with reference to FIG. 9.

Figure 9:
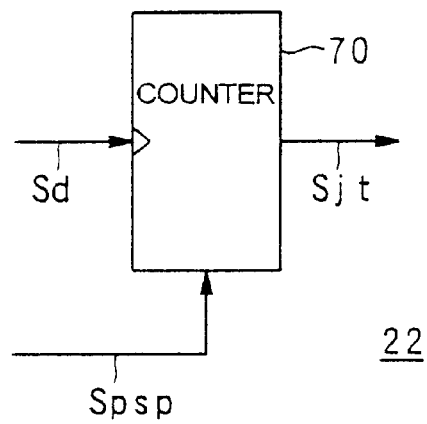
FIG. 9 is a block diagram illustrating the outline structure of a determination timing generator.

FIG. 9 is a block diagram showing the outline structure of the determination timing generator 22.

As shown in FIG. 9, the determination timing generator 22 includes a counter 70 of which the clock signal Scl is supplied to the input terminal and the position signal Spsp is supplied to the reset terminal.

Next, the operation will be described.

The counter 70 counts the number of the pulse of the clock signal Scl while the count value is reset to initial value "0" by the position signal Spsp. The counter 70 outputs one pulse of the determination timing signal Sjt every time when the count value corresponding to two sync frame (corresponding to the period of 1488T×2) is counted by the counter 70.

The pre-pit 4 is formed only in either the EVEN frame or the ODD frame in one recording sector. That is why the operation is executed in such manner.

Next, the detail configuration and operation of the error rate counter 24 will be described with reference to FIGS. 10 to 12.

Figure 10:
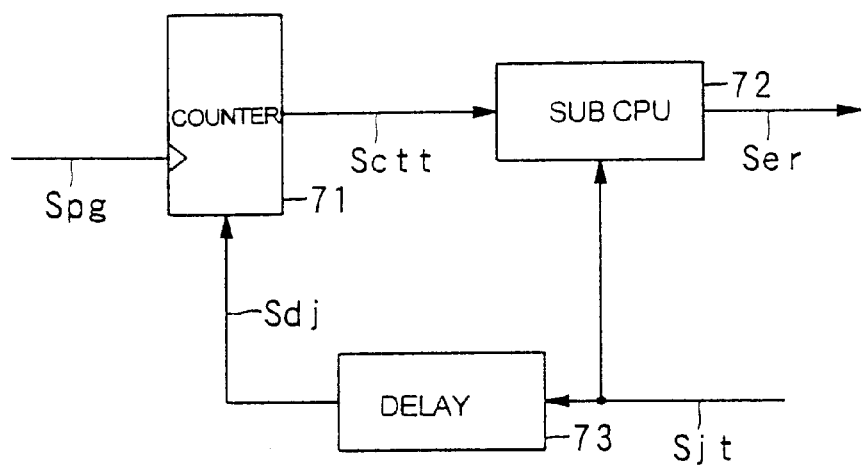
FIG. 10 is a block diagram illustrating the outline structure of an error rate calculator.

FIG. 10 is a block diagram showing the detail structure of the error rate counter 24. FIG. 11 is a timing diagram showing the detail operation of the error rate counter 24. FIG. 12 is a flow diagram showing the operation of a sub CPU.

As shown in FIG. 10, the error rate counter 24 includes a counter 71, the sub CPU 72 and a delay circuit 73.

Next, the operation will be described.

The pre-pit gate circuit 23 outputs the pre-pit gate signal Spg. Then the pre-pit gate signal Spg, which is an impulse signal indicates HIGH, is supplied to the input terminal of the counter 71 only when the pre-pit signal Spp corresponding to the pre-pit B2 is supplied to the pre-pit gate circuit 23 while the gate signal Sgt indicates HIGH. Then the counter 71 adds up the number of the pulse of the pre-pit gate signal Spg.

The counter 71 outputs the total of the addition until that moment as a count signal Sctt every time when a delay timing signal Sdj, obtained by delaying the determination timing signal Sjt by a predetermined time, is supplied to the counter 71.

The sub CPU 72 calculates an error rate at the time when the pre-pit signal Spp corresponding to the head pre-pit 4 (pre-pit B2) of each determination timing is detected, according to the below-mentioned operation based on the count signal Sctt supplied in a recording sector at the each determination timing indicated by the determination timing signal Sjt, and generates an error rate signal Ser. Then the sub CPU 72 outputs the error rate signal Ser indicating the error rate to the CPU 25. The error rate indicates such a rate that the pre-pit signal Spp is not detected at the timing when the pre-pit signal Spp corresponding to the pre-pit B2 is to be detected. The timing is indicated by the gate signal Sgt.

Figure 12:
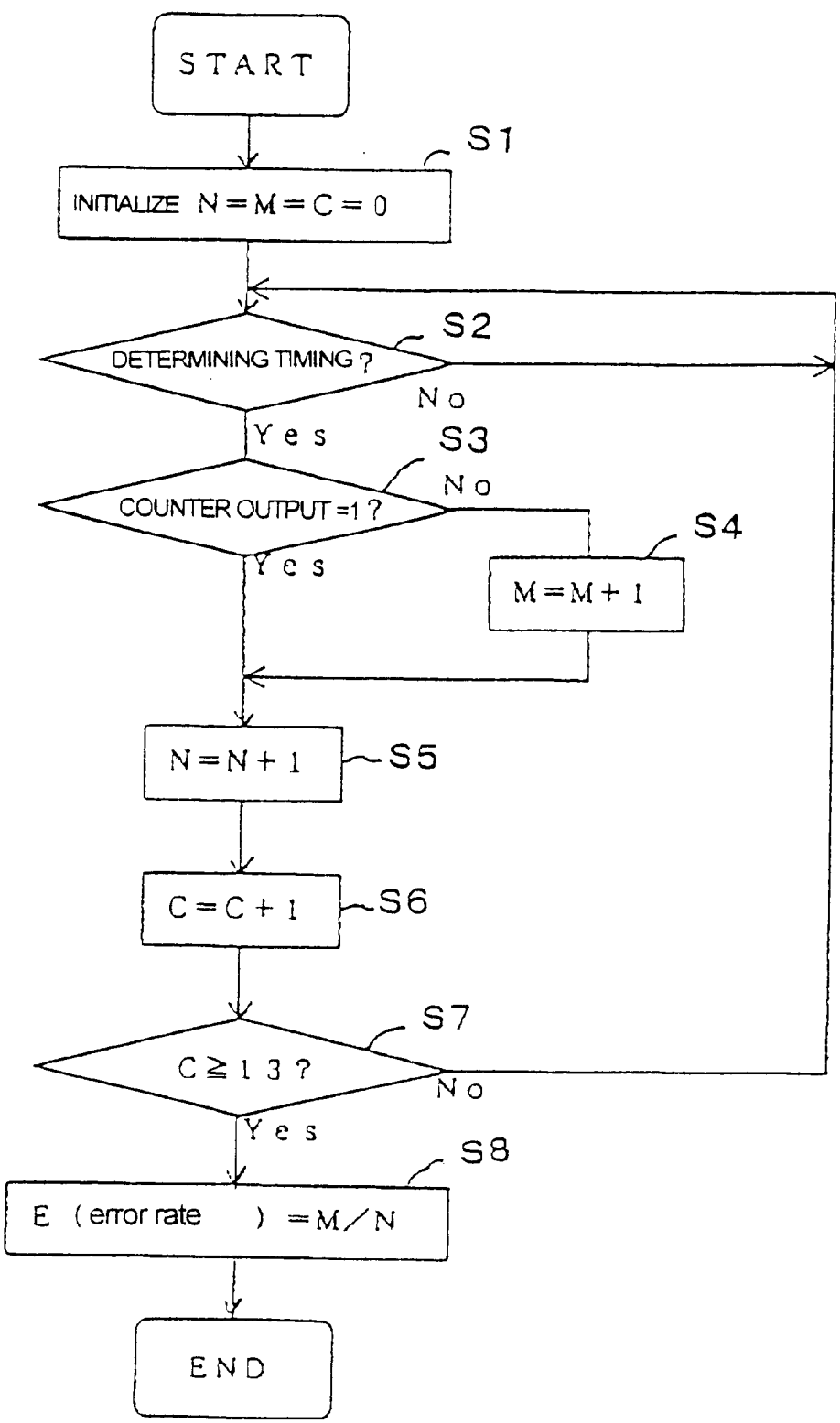
FIG. 12 is a flow diagram illustrating the operation by a sub CPU.

The sub CPU 72 executes the error rate calculating as shown in FIG. 12 at the timing indicated by the determination timing signal Sjt. Then the counter 71 is newly reset to initial value. Therefore the delay timing signal Sdj obtained by delaying the determination timing signal Sjt is used for the signal for resetting the counter 71. Accordingly, the counter 71 is reset by using the delayed signal (the delay timing signal Sdj) obtained by delaying the determination timing signal Sjt by the necessary time to execute the error rate calculating in the delay circuit 73.

Figure 11:
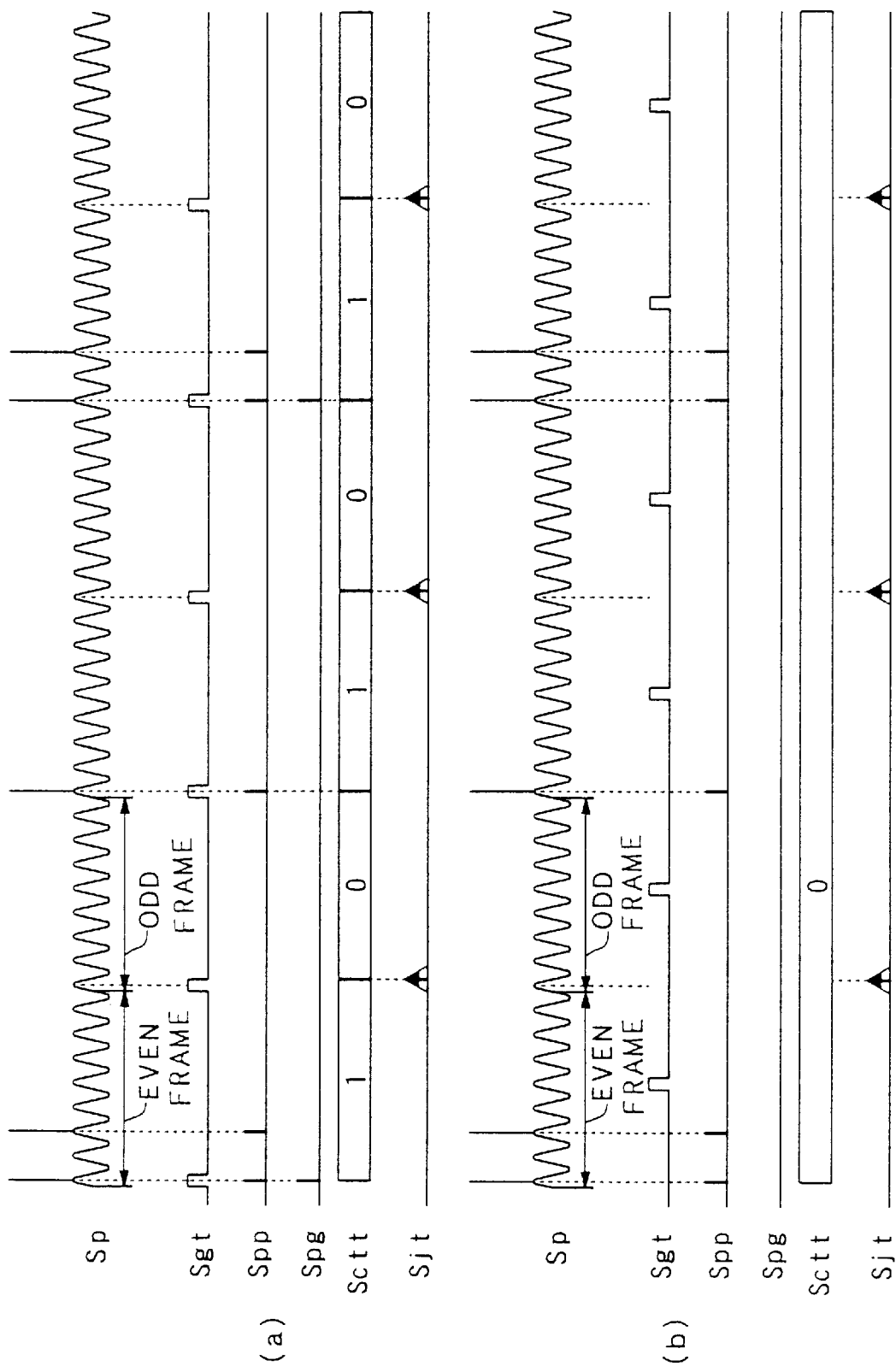
FIG. 11 is a timing chart illustrating the operation of the error rate calculator.

Next, the operation of the error rate calculator 24 will be explained with reference to FIG. 11 in the case that the pre-pit signal Spp is normally detected without any track skipping occurs as shown in FIG. 11A, and in the case that the pre-pit signal Spp is not normally detected by reason of the track skipping as shown in FIG 11B.

First, in the case that the pre-pit signal Spp is normally detected as shown in FIG. 11A, the pre-pit B2 which exists at the head of each sync frame is accurately detected while the gate signal Sgt indicates HIGH. Therefore the pulse of the pre-pit gate signal Spg is surely generated every two sync frames. As a result, the value of the counting signal Sctt is always "1" at the timing of each determination timing as shown by upward arrow in the bottom FIG. 11A.

On the other hand, in the case that the pre-pit signal Spp is not normally detected by reason of the track skipping as shown in FIG. 11B, the pre-pit B2 is not detected while the gate signal Sgt indicates HIGH. Therefore the pulse of the pre-pit gate signal Spg is not generated. As a result, the value of the counting signal Sctt always keeps "0" at the timing of each determination timing as shown by upward arrow in the bottom FIG. 11B.

The sub CPU 72 executes the error rate calculating by using the counting signal Sctt whose value changes as mentioned above, and generates the error rate signal Ser.

Next, the error rate calculating by the sub CPU 72 by using the determination timing signal Sji and the counting signal Sctt will be explained with reference to FIG. 12.

As shown in FIG. 12, in the error rate calculating, the parameter N indicating the number of examining the detecting error, a parameter M indicating the number of determining the error in the examination, and a parameter C indicating the amount of data for two frames used for the error rate every one recording sector are respectively initialized (Step S1). The detecting error indicates that the pre-pit B2 is not detected while the gate signal Sgt is HIGH.

Next, it is determined whether the determination timing of the error rate reaches based on the determination timing signal Sjt (Step S2).

If the timing does not reach (Step S2; No), the operation is suspended until the timing reaches. If the timing reaches (Step S2; Yes), the value of the counting signal Sctt is checked (Step S3).

If the value of the counting signal Sctt is "1" (i.e., in the case that the pre-pit signal Spp is normally detected) (Step S3; Yes), the operation shown in Step S5 is executed. However, if the value of the counting signal Sctt is not "1" (i.e., in the case that the pre-pit signal Spp is not normally detected) (Step S3; No), after the value of the parameter M is incremented (Step S4), the operation shown in Step S5 is executed.

Next, the value of the parameter N (indicating the number of the determination) is incremented (Step S5), and the value of the parameter C is incremented (Step S6). Then it determined whether the value of the parameter C becomes equal or greater than "13" (i.e., whether the operation shown from Step S2 to Step S6 is executed for the sync frame of one recording sector.) (Step S7).

If the value of the parameter C is not equal or greater than "13" (Step S7; No), the error rate for the period corresponding to one recording sector is unable to calculate. Therefore, the operation shown in Step S2 is executed in order to execute the operation shown from Step S2 to Step S6 for the rest of data. However, if the value of the parameter C is equal or greater than "13" (Step S7; Yes), the error rate for the period corresponding to one recording sector is able to calculate. The error rate is calculated as follows (Step S8):

$$E \text{ (the error rate)} = M \text{ (the number of detection of error)} / N \text{ (the number of determination)}$$

The operation for the period corresponding to one recording sector is completed.

According to the operation shown in FIG. 12, the probability (error rate) of occurrence of the track skipping for the period corresponding to one recording sector is calculated by dividing the number of detection of error by the number of determination.

Figure 13:
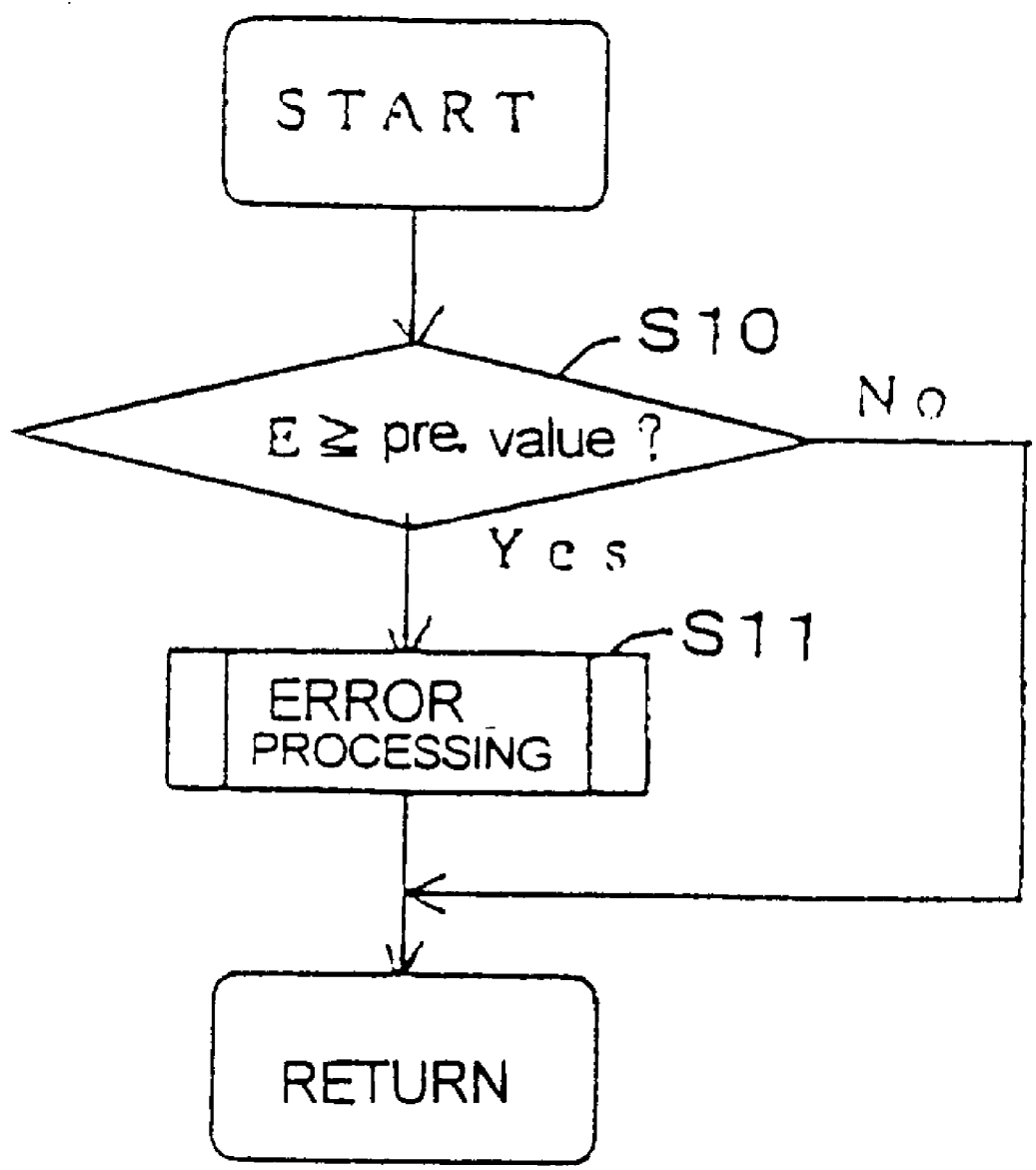
FIG. 13 is a flow diagram illustrating the operation by a CPU.

Next, the operation of the CPU 25 by using the error rate signal Ser indicating the error rate calculated by the operation shown in FIG. 12 will be explained with reference to the flow diagram of FIG. 13.

First, the CPU 25 determines whether the error rate E indicated by the error rate signal Ser more than or equal to the predetermined threshold indicating the occurrence of the track skipping (Step S10). If the error rate E is less than the predetermined threshold (Step S10; No), the track skipping is not generated. Therefore the control signal Set for controlling the DVD encoder 15 is generated so that regular recording operation is continued, and is supplied to the DVD encoder 15.

On the other hand, in determination shown in Step S10, if the error rate E is less than the predetermined threshold (Step S10; Yes), the track skipping occurs. Therefore the control signal Sct for controlling the DVD encoder 15 is generated so that the output of the modulation signal Sec from the DVD encoder 15 is stopped to suspend the recording, and is supplied to the DVD encoder 15 (Step S11).

Next, method of setting the threshold will be explained.

First, the threshold is set in consideration of the probability of detecting the pre-pit 4 at any position other than the head of each sync frame by chance according to the track skipping. In other words, the threshold is set in consideration of the probability of incorrectly identifying the pre-pit 4 detected at any position other than the head of each sync frame by chance according to the track skipping as the pre-pit B2 which is at the head in spite of the fact that the proper pre-pit B2 which is the head pre-pit4 is not detected by reason of the track skipping.

The pre-pit B1 (referred to the table) appears only once per one recording sector. Therefore the probability of incorrectly identifying the pre-pit B1 as the pre-pit B2 which is at the head is extremely low, and can become negligible.

On the other hand, the pre-pit B0 (referred to the table) has a 50% probability of existence either in the sync code or in the data section of one sync frame.

Consequently, if the threshold in operation of the Step S 10 is set to 50%, for example, it can be near correctly determined that the head pre-pit B2 is not detected, i.e., the track skipping is generated even in consideration of the probability of incorrectly identifying the pre-pit B1 and B1 which are not at the head of the sync frame as the pre-pit B2 which is at the head.

As mentioned above, according to the information recording apparatus S of the present invention, if the pre-pit B2 is not detected at constant intervals when it is to be detected, it is determined that the track skipping which is likely to cause the abnormal condition of detecting at the time of detection of the main information is generated. Therefore the occurrence of the track skipping at the time of recording can be promptly and accurately detected.

The presence or absence of the occurrence of the track skipping is determined according to the result of the detection of the head pre-pit B2 based on the gate signal Sgt corresponding to the timing when the head pre-pit B2 is to be detected. Therefore the information recording apparatus of the present modified embodiment can be simplified in its structure, and the presence or absence of the occurrence of the track skipping can be accurately detected.

If the probability that the head pre-pit B2 is not detected at the timing indicated by the gate signal Sgt is more than or equal to 50%, it is determined that the track skipping is generated. Therefore the effect of the noise generated infrequently is eliminated and the presence or absence of the occurrence of the track skipping can be accurately detected.

If the probability of incorrectly detecting the head pre-pit B2 at the time of recording data corresponding to one recording sector is more than or equal to 50%, it is determined that the track skipping occurs. Therefore the generation of track skipping can be detected as early as within the range that the error correction is available at the time of reproduction (the one block of ECC), and it is prevented that the error correction is not available at the time of reproduction.

DVD-R 1 is rotated at the constant linear velocity, and the head pre-pit B2 is recorded every two sync frames in advance. Therefore the presence or absence of the occurrence of the track skipping is reliably detected.

The occurrence of the track skipping is promptly and reliably detected at the time of recording the main information. Therefore it is prevented that the main information is recorded so that the abnormal condition occurs at the time of reproduction.

In the embodiment, the threshold in the operation shown in the Step S10 is set to 50%. It depends on the arrangement of the pre-pit 4 in the DVD-R1 as shown in the table. However, the threshold should be arbitrary modified according to the arrangement of the pre-pit 4 or in consideration of the probability of incorrectly identifying the pre-pit 4.

In the embodiment, the operation of recording is suspended if the track skipping is generated. In addition to that, if the track skipping is generated, the intensity of the light beam B for recording can be reduced to the extent which recording becomes impossible, or the occurrence of the track skipping can be informed the user.

In the embodiment, the presence or absence of the occurrence of the track skipping is determined by using the error rate calculated in the period corresponding to one recording sector. In addition to that, the error rate can be calculated in the longer period than one recording sector if the longer period is within the range which the error correction is executed at the time of reproduction.

In the embodiment, the presence or absence of the occurrence of the track skipping is determined by the result of detection of the head pre-pit B2. In addition to that, the present invention can be applied to the detection of the error except for the track skipping, i.e., recording error caused by the flaw on the DVD-R1, if the error is in relation with detection of the head pre-pit B2.

In the embodiment, the present invention is applied to the recording the main information on the DVD-R1. In addition to that, the present invention can be applied to the recording it on the optical disc that is possible to rewrite a plurality of times having the pre-pit 4 in advance, such as the DVD-RW (DVD-Rewriterble).

In the embodiment, the present invention can be applied to the detection of the error in an information reproducing apparatus detecting the pre-pit 4.

The invention may be embodied in other specific forms without departing from the the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H11-232713 filed on Aug. 19, 1999 including the specification, claims, drawings and summary is incorporated herein by reference in its entirety.

What is claimed is:

1. An apparatus for detecting an abnormal condition at a time of recording or reproduction of information on an information recording medium comprising:
   a detecting device for detecting control information to be detected every predetermined constant period in the information recording medium at least either at the time of recording or at the time of reproduction, the control information to control at least either the recording or the reproduction of main information; and
   a determining device for determining that the abnormal condition occurs in either the recording or the reproduction, if no control information is detected every predetermined constant period,
   wherein said detecting device includes a generating device for generating a gate signal at the time that the control information is to be detected in the information recording medium, and said determining device determines that the abnormal condition occurs if no control information is detected at the time indicated by the gate signal.

2. An apparatus according to claim 1, wherein said control information is used for controlling a recording of the main information on the information recording medium, and the apparatus further comprises a controlling device for controlling the recording of the main information on the information recording medium on the basis of the result of the determination by the determining device.

3. An apparatus according to claim 1, wherein said determining device determines that no control information is detected if the probability that no control information is detected is higher than or equal to a predetermined threshold.

4. An apparatus according to claim 1, wherein said determining device determines that no control information is detected if the probability that no control information is detected is higher than or equal to a predetermined threshold in a period to record or reproduce the amount of information corresponding to the maximum amount of information to be error-corrected at a time while the main information is reproduced.

5. An apparatus according to claim 1, wherein said information recording medium is an optical disc rotated at a constant linear velocity, and said control information is recorded every predetermined amount for the main information on the information recording medium in advance and includes at least address information indicating a recording position of the main information on the information recording medium.

6. An apparatus for detecting an abnormal condition at the time of recording or reproduction of information on an information recording medium comprising:
   a detecting device for detecting control information to be detected every predetermined constant period in the information recording medium at least either at the time of recording or at the time of reproduction, the control information to control at least either the recording or the reproduction of main information; and a determining device for determining that the abnormal condition occurs in either the recording or the reproduction, if no control information is detected every predetermined constant period, wherein said abnormal condition is detected as a track skipping that an irradiated position by a light beam to be irradiated on an optical disc is unexpectedly skipped from a position of the track to be correctly irradiated to a different position.

7. A method of detecting an abnormal condition at the time of recording or reproduction of information on an information recording medium comprising:

a detecting process of detecting control information to be detected every predetermined constant period in the information recording medium at least either at the time of recording or at the time of reproduction, the control information to control at least either the recording or the reproduction of main information; and a determining process of determining that the abnormal condition occurs in either the recording or the reproduction, if no control information is detected every predetermined constant period, wherein said abnormal condition is detected as a track skipping that an irradiated position by a light beam to be irradiated on an optical disc is unexpectedly skipped from a position of the track to be correctly irradiated to a different position.

8. A method of detecting an abnormal condition at a time of recording or reproduction of information on an information recording medium comprising:

a detecting process of detecting control information to be detected every predetermined constant period in the information recording medium at least either at the time of recording or at the time of reproduction, the control information to control at least either the recording or the reproduction of main information; and a determining process of determining that the abnormal condition occurs in either the recording or the reproduction, if no control information is detected every predetermined constant period, wherein said detecting process includes a generating device for generating a gate signal at the time that the control information is to be detected in the information recording medium, and said determining process determines that the abnormal condition occurs if no control information is detected at the time indicated by the gate signal.

9. A method according to claim 8, wherein said control information is used for controlling a recording of the main information on the information recording medium, and the method further comprises a controlling process of controlling the recording of the main information on the information recording medium on the basis of the result of the determination by the determining process.

10. A method according to claim 8, wherein said determining process determines that no control information is detected if the probability that no control information is detected is higher than or equal to a predetermined threshold.

11. A method according to claim 8, wherein said determining process determines that no control information is detected if the probability that no control information is detected is higher than or equal to a predetermined threshold in a period to record or reproduce the amount of information corresponding to the maximum amount of information to be error-corrected at a time while the main information is reproduced.

12. A method according to claim 8, wherein said information recording medium is an optical disc rotated at a constant linear velocity, and said control information is recorded every predetermined amount for the main information on the information recording medium in advance and includes at least address information indicating a recording position of the main information on the information recording medium.

\* \* \* \* \*